United States Patent [19]
Desai

[11] Patent Number: 5,207,977
[45] Date of Patent: May 4, 1993

[54] REACTOR PRESSURE VESSEL WITH FORGED NOZZLES

[75] Inventor: Dilip R. Desai, Fremont, Calif.

[73] Assignee: General Electric Company, San Jose, Calif.

[21] Appl. No.: 898,245

[22] Filed: Jun. 12, 1992

Related U.S. Application Data

[63] Continuation of Ser. No. 745,647, Aug. 16, 1991, abandoned.

[51] Int. Cl.⁵ .......................................... G21C 13/02
[52] U.S. Cl. .................................................. 376/294
[58] Field of Search ................. 376/294; 976/167, 169, 976/170, 173

[56] References Cited

U.S. PATENT DOCUMENTS

| | | | |
|---|---|---|---|
| 3,578,564 | 5/1971 | Fletcher | 376/294 |
| 4,057,163 | 11/1977 | Widart et al. | 376/294 |
| 4,892,702 | 1/1990 | Vignes | 376/294 |

Primary Examiner—Donald P. Walsh
Assistant Examiner—Frederick H. Voss
Attorney, Agent, or Firm—Harry C. Burgess

[57] ABSTRACT

Inlet nozzles for a gravity-driven cooling system (GDCS) are forged with a cylindrical reactor pressure vessel (RPV) section to which a support skirt for the RPV is attached. The forging provides enhanced RPV integrity around the nozzle and substantial reduction of in-service inspection costs by eliminating GDCS nozzle-to-RPV welds.

2 Claims, 2 Drawing Sheets

REACTOR PRESSURE VESSEL WITH FORGED NOZZLES

The Government of the United States has rights to this invention under Contract No. DE-AC03-90SF1849.

This is a continuation of copending application Ser. No. 07/745,647 filed Aug. 16, 1991, now abandoned.

BACKGROUND OF THE INVENTION

This invention relates to nuclear reactors and, more particularly, to a reactor pressure vessel for such a reactor. A major objective of the present invention is a reactor pressure vessel susceptible of more convenient and economical in-service inspection.

Boiling-water reactors store heat generated by a reactor core primarily in the form of a phase conversion of a heat transfer medium from a liquid phase to a vapor phase. The vapor phase can be used to physically transfer stored energy to a turbine that drives a generator, to produce electricity. Condensate from the turbine can be returned to the reactor, merging with recirculating liquid for further heat transfer and cooling.

BWRs typically have a reactor pressure vessel (RPV) that encloses the nuclear fuel. The RPV confines water and steam to predetermined circulation paths that are isolated from a drywell in which the RPV is located. The RPV is supported by a carbon steel skirt that flares downward and outward to a flange that rests on a concrete floor within the drywell. The length of this skirt is selected to limit stresses due to thermal and dynamic loads. In some designs, the skirt also serves as a seal between the upper and lower levels of the drywell.

An RPV must be in fluid communication with external components. Steam outlets and steam lines are provided to direct the steam to a turbine that, in turn, drives an electric generator. Feedwater inlets and conduits are provided for returning condensate from the turbine back to the RPV. For a reactor to operate safely, it is equipped with safety systems. Of particular interest herein is a gravity-driven coolant system (GDCS), which is used to replenish coolant lost from the RPV.

Such fluid communication requires the connection of conduits to the RPV. Generally, nozzles are installed on the RPV for conveniently coupling to the conduits. Typically, these nozzles are forged separately from the RPV and then welded into apertures through the RPV sidewall. Standard practice for the nuclear industry is to inspect all welds periodically.

In at least one reactor design, the nozzles for the GDCS are required to be at a height slightly below the level at which the skirt is attached to the vessel. Inspecting the welds for such nozzles would require examining under the skirt, which provides little or no clearance, or examining the welds from inside the vessel, which can be burdensome, since these welds are typically obscured by other internal components. While this problem has arisen in the context of GDCS nozzles, it can occur for nozzles used for other purposes, depending on reactor design. What is needed is an RPV that provides nozzles at support skirt level without imposing an undue burden on weld inspection.

SUMMARY OF THE INVENTION

In accordance with the present invention, nozzles are forged with, rather than welded to, the cylindrical section bearing the RPV support skirt. This results in improved structural integrity of the RPV. The considerable additional expense involved in forging inspections each weld inspection cycle, resulting in dramatic savings over the life of a reactor. These and other features and advantages of the present invention are apparent in the following description with references to the drawings below.

DESCRIPTION OF THE PREFERRED EMBODIMENTS

Figure 1:
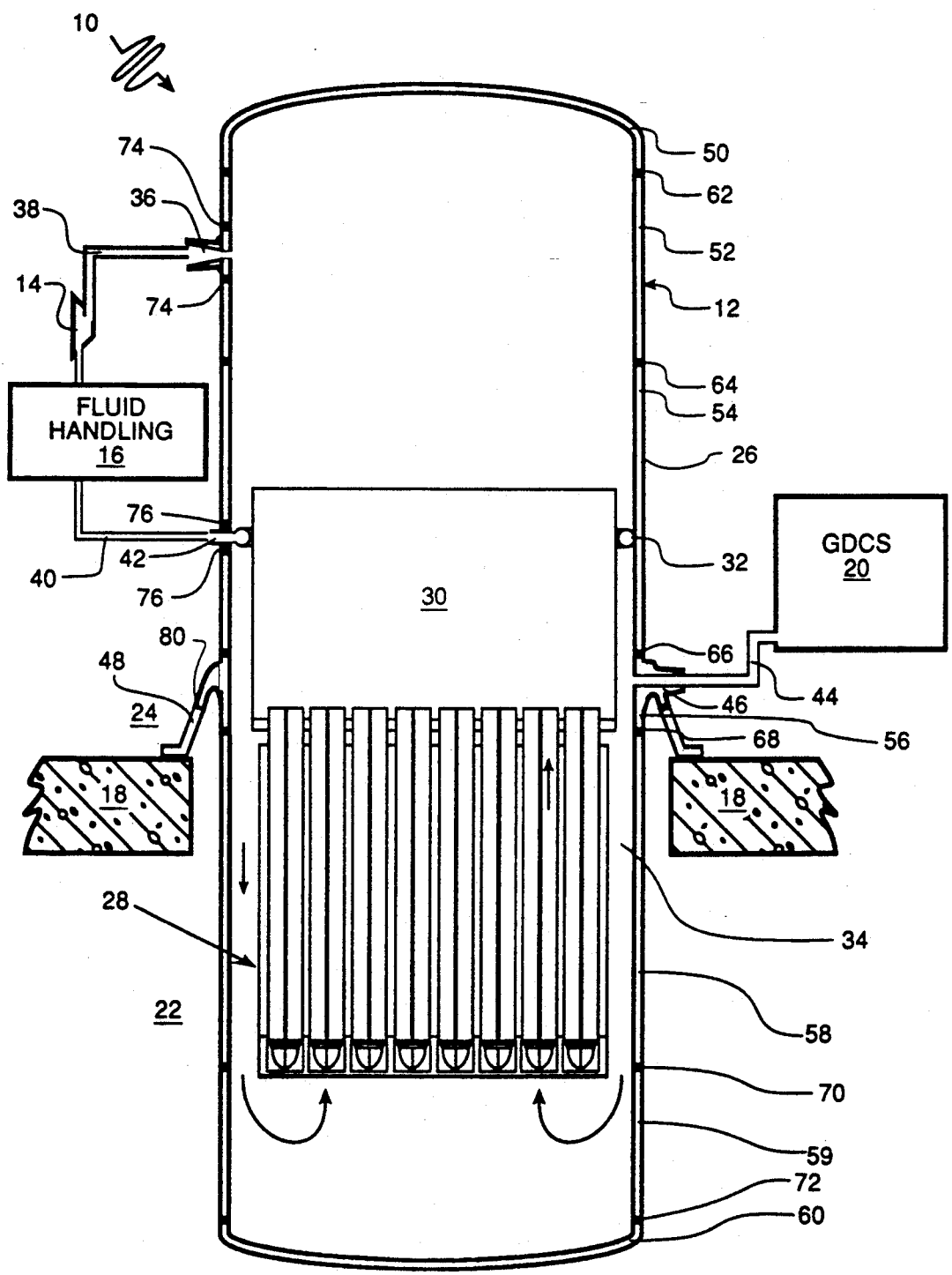
FIG. 1 is a schematic elevational sectional view of a boiling-water reactor system in accordance with the present invention.

In accordance with the present invention, a boiling-water reactor plant system 10 includes a reactor 12, a turbine 14, a fluid handling system 16, a concrete floor 18, a gravity-driven cooling system (GDCS) 20, a lower drywell 22 and an upper drywell 24, as shown in FIG. 1. Reactor 22 includes a reactor pressure vessel (RPV) 26 and its internals, including a core 28, a chimney 30 with integral dryer and steam separator assembly, and a feedwater sparger 32. RPV 26 is supported on floor 18 by a support skirt 48.

Figure 2:
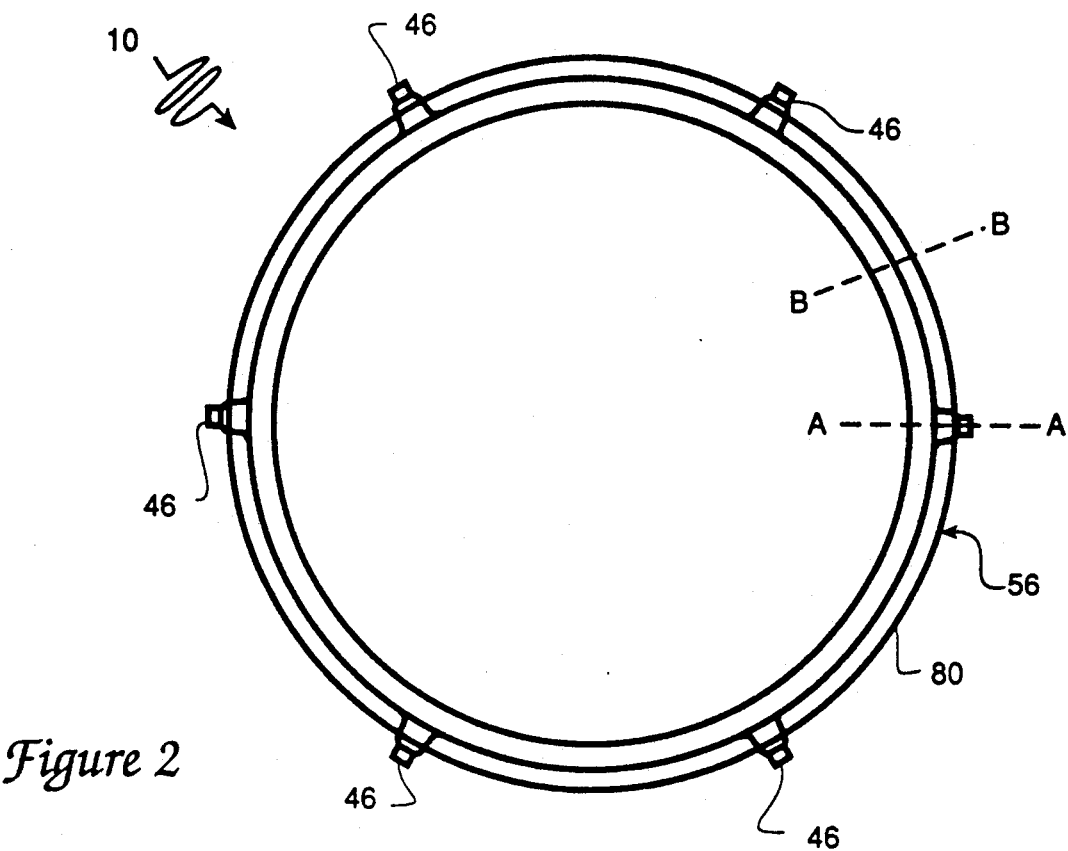
FIG. 2 is a plan view of an RPV band of the reactor of FIG. 1.

As indicated by the arrows within RPV 26, coolant circulates up through core 28 and chimney 30, and down downcomer 34. Provisions are also made for coolant to flow in and out of RPV 26 in both normal and accident conditions. Two main stream outlet nozzles 36 (one shown) allow steam to exit RPV 26 and flow through main steam line 38 to drive turbine 14, which can then drive a generator to produce electricity. Condensate from turbine 14 is received by fluid handling system 16 which can pump water back to RPV 26 through conduit 40 and four (one shown) feedwater return nozzles 42, which are coupled to sparger 32. During certain accident conditions, GDCS provides water to RPV 26 through a GDCS line 44 and six GDCS inlet nozzles 46, as indicated in FIGS. 1 and 2.

RPV 26 is assembled from several sections, a top head section 50, a first cylindrical section 52, a second cylindrical section 54, a third cylindrical section 56, a fourth cylindrical section 58, a fifth cylindrical section 59, and a bottom head section 60, as indicated in FIG. 1. Circumferential welds 62, 64, 66, 68, 70, 72 weld sections 50-60 together. The sections are welded together at their boundaries. Main stream outlet nozzles 36 are welded to first cylindrical section 52 by local welds 74 (one shown). Feedwater return nozzles 42 are welded to second cylindrical section 54 by local welds 76 (one shown).

Figure 3:
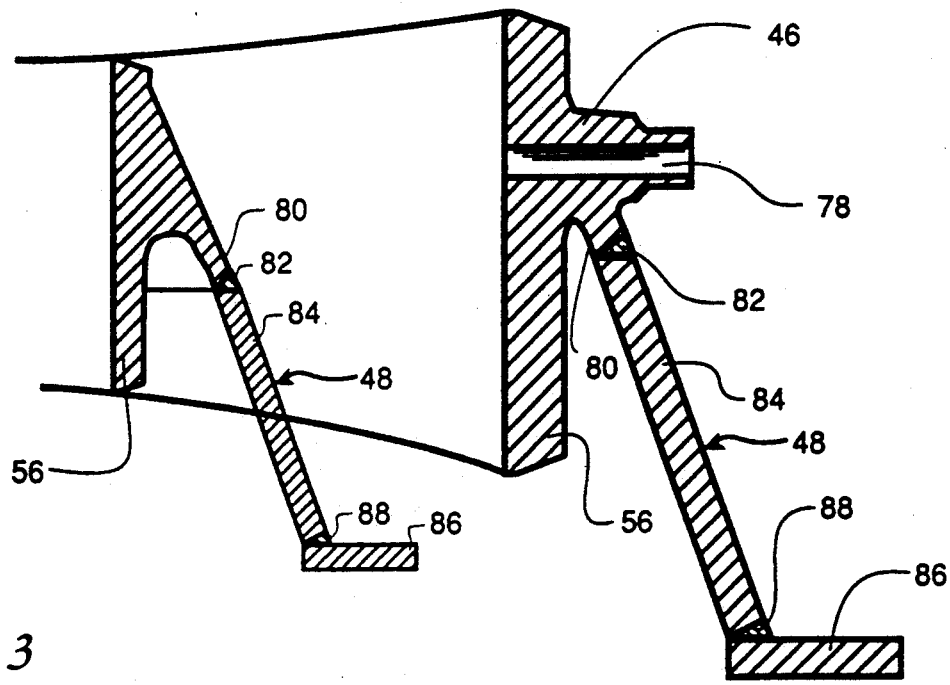
FIG. 3 is a section view, taken through lines A—A and B—B of FIG. 2, of the RPV of FIG. 2 but with a support skirt and flange (shown in FIG. 1) attached.

Separate design considerations dictate that support skirt 48 join RPV 26 at the height of GDCS inlet nozzles 46. To avoid difficult-to-inspect nozzle welds, GDCS inlet nozzles 46 are forged with third cylindrical section 56. FIG. 3 shows sections of third cylindrical section 56 taken at the locations shown in FIG. 2. Section A is taken through a GDCS nozzle, while section B is taken where there is no nozzle. As indicated in FIG. 3, since nozzles 46 are forged with third cylindrical section 56, there are no welds attaching GDCS nozzles to section 56. Aperture 78 is shown through a GDCS nozzle 46.

Forged with section 56 and nozzles 46 is a circumferential ridge 80, which provides a surface to which support skirt 48 is attached via a skirt weld 82. Support skirt 48 includes a skirt section 84 and a flange 86 attached by a flange weld 88. In this arrangement, support skirt 48 provides a seal between lower drywell 22 and upper drywell 24. Advantageously, nozzles 46 do not penetrate skirt section 84. If a nozzle penetrated skirt section 84, the aperture through which the penetration occurred would have to be sealed, and the seal inspected periodically. However, the invention provides for this alternative arrangement as well.

The present invention provides for the forging of nozzles in addition to GDCS nozzles into RPV sections. In other embodiments, other nozzles are required at the level of a support skirt or other obstacle to inspection. The invention also provides for forging of accessible nozzles simply to improve integrity and reduce inspection requirements. While forging of the nozzles with the RPV sections appears to be most practical, other methods of weldlessly integrating nozzles and RPV sections are provided for. Furthermore, the invention is not limited to boiling-water reactors. Vessels and nozzles for other types of nuclear reactors are provided for.

In addition, the support skirt need not be supported by a floor. Other concrete containment structures can serve as a base for the support skirt. For example, pedestals and ledges in sidewalls can serve as bases for support skirts. These and other modifications to and variations upon the described embodiments are provided for by the present invention, the scope of which is limited only by the following claims.

What is claimed is:
1. A reactor vessel for enclosing nuclear fuel and coolant in a nuclear reactor comprising:
   a top, a bottom, and a vertically extending series of generally cylindrical sections extending between said bottom and said top,
      a first of said cylindrical sections having at least one nozzle formation weldlessly formed therein,
      a second of said cylindrical sections having a nozzle welded thereto; and
   a support skirt for supporting said reactor pressure vessel on a concrete structure, said support skirt flaring outward toward said concrete structure, said support skirt being welded to said first cylindrical section and to said nozzle formation.

2. A reactor vessel for enclosing nuclear fuel and coolant in a nuclear reactor comprising:
   a top, a bottom, and a vertically extending series of generally cylindrical sections extending between said bottom and said top,
      a first of said cylindrical sections having at least one nozzle formation weldlessly formed therein, said first cylindrical section having forged therewith a ridge extending below said nozzle formation,
      a second of said cylindrical sections having a nozzle welded thereto; and
   a support skirt for supporting said reactor pressure vessel on a concrete structure, said support skirt flaring outward toward said concrete structure, said support skirt being welded to said ridge so that said support skirt is entirely below said nozzle formation.

* * * * *